(Model.)
C. H. MALMEDIE.
REAMER.
No. 294,484. Patented Mar. 4, 1884.
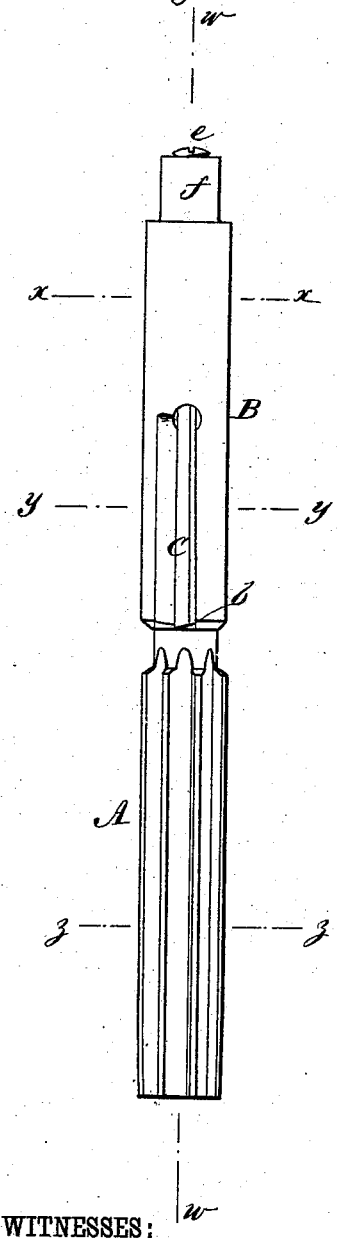
Fig. 1
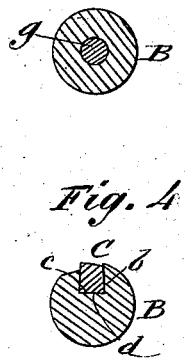
Fig. 3
Fig. 4
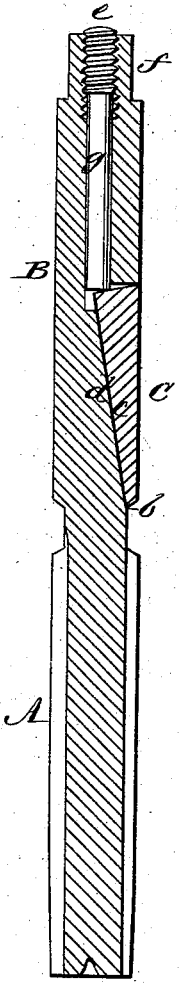
Fig. 2
Fig. 5
WITNESSES:
C. Neveux
C. Sedgwick
INVENTOR:
C. H. Malmedie
BY Munn & Co
ATTORNEYS.

UNITED STATES PATENT OFFICE.

CHARLES H. MALMEDIE, OF NEW BEDFORD, MASSACHUSETTS.

REAMER.

SPECIFICATION forming part of Letters Patent No. 294,484, dated March 4, 1884.

Application filed June 22, 1883. (Model.)

*To all whom it may concern:*

Be it known that I, CHARLES H. MALMEDIE, of New Bedford, in the county of Bristol and State of Massachusetts, have invented certain new and useful Improvements in Reamers, of which the following is a full, clear, and exact description.

This invention relates to tools designed to be operated either by hand—as in a pair of stocks—or mechanically—as in a lathe or drilling machine—for enlarging or dressing out a hole previously made. My improvements upon such tools, or "reamers," as they are termed, combine in the one device a reamer of fixed size or diameter, an expanding or adjustable cutter or reamer, and a gage of standard size for determining the size of the reamed hole, whereby greater accuracy is obtained in the use of the tool, its durability is increased, and greater facility is afforded for reaming out holes of required fixed dimensions, substantially as hereinafter described.

Reference is to be had to the accompanying drawings, forming part of this specification, in which similar letters of reference indicate corresponding parts in all the figures.

Figure 1 represents an exterior longitudinal view of a reamer embodying my invention. Fig. 2 is a central longitudinal section on the line *w w* in Fig. 1 of the same; and Figs. 3, 4, and 5 are transverse sections on the lines *x x*, *y y*, and *z z*, respectively, of Fig. 1.

The advance portion A of the tool shown in the drawings is of a fixed size or diameter—that is, is made non-expanding and many-edged or fluted as other reamers are made. Back of this cutting or reaming portion A is the shank B of the tool, which shank is ground exactly to standard size of the hole required to be made by the tool, and which constitutes the gage of the tool, and will show when the reaming portion A is worn below size, as in such case the gage B cannot follow or enter the hole made by the reaming portion A. To provide for the reamer or tool making a hole of the required size as determined by the gage B, after its reaming portion A has been worn below the size of said gage, the shank or gage B has fitted longitudinally within its forward portion, and so as to protrude through the side thereof, a cutter, C, adjustable as regards its cutting-edge in diametrical relation to the tool; or there may be two or more of such cutters arranged at suitable distances apart around the gage. The diametrical adjustment of said cutter C may be effected by constructing said cutter, which enters within a longitudinal groove, *b*, in the forward portion of the gage, with an inclined inner surface, *c*, sloping outward toward its front end, and causing the same to rest upon a correspondingly-inclined surface, *d*, in the bottom of the groove, so that the cutter C rests upon solid stock, and so that by setting the cutter forward the necessary diametrical adjustment of its cutting-edge relatively to the tool to conform to the size of the gage is secured. The forward adjustment of the cutter, which is inserted on a sharp angle with a bevel on the back side within the groove *b*, forming a dovetail fit with the cutter, to prevent it from giving way in reaming and to insure a smooth hole, may be effected by a screw, *e*, inserted within the square or holding portion *f* of the tool and arranged to bear against a pin, *g*, fitted to slide longitudinally within the center of the shank and lying at its front end against the rear end of the cutter C. The cutter C extends below the lower end of the gage, so that it will commence cutting before the gage reaches the hole. By means of this expanding cutter or additional reaming device C it is only necessary, when finding that the gage B will not follow or enter the hole made by the reaming portion A, in consequence of the wear of the latter, to set up or forward said cutter C a little, when the hole may be reamed to standard size of the gage. By taking out the screw *e* and the pin *g*, the cutter C can readily be driven back to the end of the slot.

I do not abandon or dedicate to the public any patentable feature set forth herein and not hereinafter claimed, but reserve the right to claim the same either in a reissue of any patent that may be granted upon this application or in other applications for Letters Patent that I may make.

Having thus described my invention, what I claim as new, and desire to secure by Letters Patent, is—

1. The combination, with a reamer having its shank constructed to form a gage, of an adjustable cutter arranged in said shank, substantially as herein shown and described, whereby provision is made for making a hole as determined by the gage after the reaming portion proper has become worn below the size, as set forth.

2. The combination, with a many-edged reamer having its shank constructed to form a gage, of an adjustable cutter arranged in a longitudinal slot in said shank, and extending below the lower end of the gage, substantially as herein shown and described, whereby the cutter is presented to the work in advance of the shank, as set forth.

3. In a reamer, the combination, with the many-edged reaming portion A, and its slotted shank B, constructed to form a gage, of the cutter C, the pin $g$, and screw $e$, substantially as herein shown and described.

CHARLES H. MALMEDIE.

Witnesses:
FRANK A. MILLIKEN,
EDWARD J. LUCE.